Patented May 4, 1937

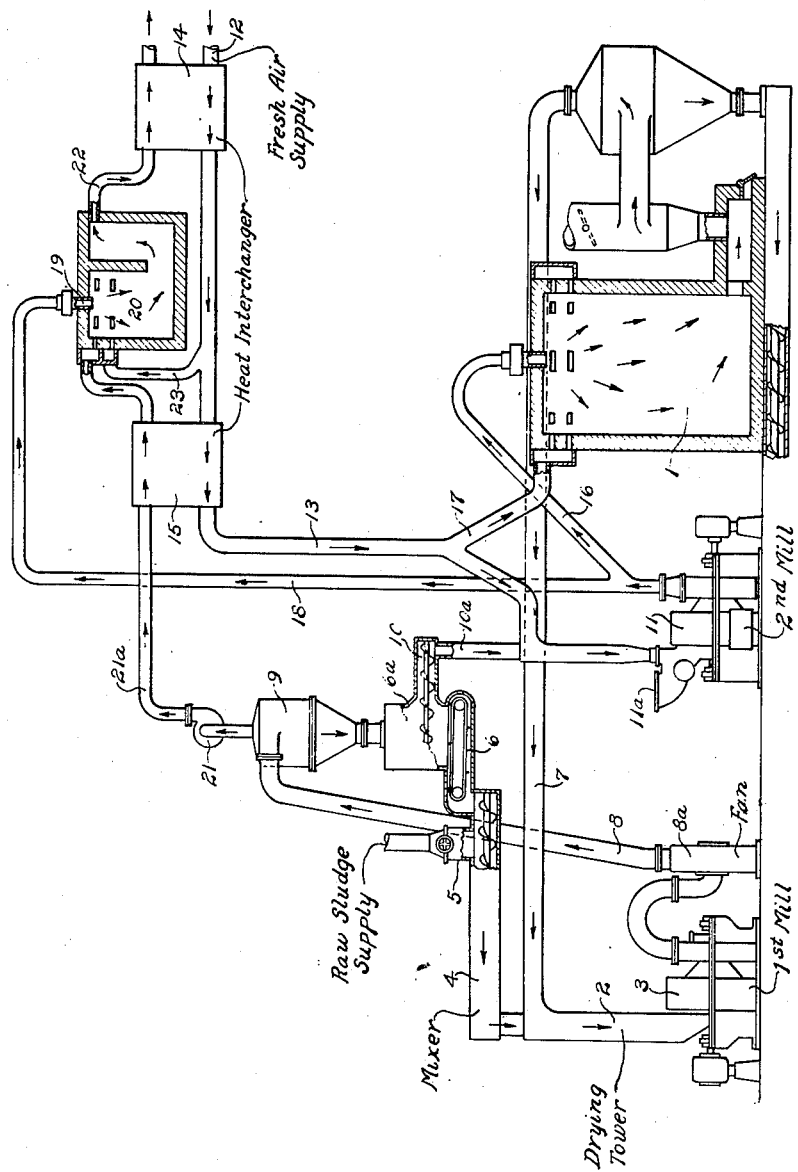

2,078,925

UNITED STATES PATENT OFFICE 2,078,925

PROCESS AND APPARATUS FOR DEODORIZING GASES

Haldwell S. Colby, Port Washington, N. Y., and Richard F. O'Mara, Chicago, Ill., assignors to Raymond Bros. Impact Pulverizer Co., Chicago, Ill.

Original application June 14, 1934, Serial No. 730,582. Divided and this application September 12, 1935, Serial No. 40,236

6 Claims. (Cl. 183—6)

The present application is a division of application No. 730,582, filed by the present applicants on June 14, 1934, (since issued as U. S. Patent No. 2,032,402, on March 5, 1936).

In said parent application there is described and claimed a system for disposing of so-called sewage sludge, such system including a secondary furnace to which gases are carried to have burned out of them objectionable odors acquired during the general process. The method of, and apparatus for, burning out the odors forms the subject matter of the present application. Obviously the source of the gases with the objectionable malodorous constituents is immaterial as far as the present invention is concerned. It will however be of some advantage to describe briefly the entire system and this will therefore be done.

The single figure of the accompanying drawing illustrates such a system including our present invention.

In the drawing the main furnace in which the dried pulverized sludge is to be burned is designated by the reference numeral 1. The sludge undergoes a first drying and pulverizing in the drying tower 2 and mill 3, being fed into the former from the mixer 4. This mixer receives the raw sludge at 5, and, in accordance with existing practice, mixes it with a certain amount of previously dried sludge which is returned and fed to the mixer by conveyor 6. The drying tower 2 receives hot gases of combustion from the furnace by means of the duct 7. The current of hot gases leaves the mill 3 and is forced by the fan 8a through duct 8, carrying with it the ground sludge into the collector-separator 9, which discharges the dried material to the conveyor box 6a. From here a portion is returned to mixer 4, as mentioned above, the remainder being fed to the second mill 11 by means of the screw conveyor 10 and the pipe 10a. This second mill 11 grinds and dries the sludge further, this being done in the presence of fresh air taken from the atmosphere at 12 and delivered to the mill by duct 13 after passing through the air heater 14 and the gas heater 15. In the former of these the air is heated to a high degree by means more fully referred to below and in the second it again gives up part of its heat. The heated air carries sludge from mill 11 by means of duct 16 to the furnace 1, the air serving as primary combustion air. Secondary combustion air for the furnace 1 is taken off duct 13 and carried to the furnace by duct 17.

Some of the sludge which has undergone additional grinding and drying in the mill 11 is, together with a portion of the air carrying it, conducted by means of pipe 18 to the burner 19 of a second furnace 20. The purpose and benefit of this second furnace is more fully explained in the parent application. Its main function is to burn odors out of the gases leaving the separator 9 before they are discharged to atmosphere. They are forced through duct 21a and into the second furnace 20 by means of the fan 21, passing on their way through the gas heater 15 in which they become heated. Only enough fuel is carried into the furnace 20 by means of pipe 18 to burn out the odors from the gases delivered through duct 21a. The products of combustion leave the furnace 20 by the duct 22 and give up their heat or as much as is practically feasible to the air entering the air preheater 14 by the duct 12. This air, so preheated, flows through the gas preheater 15 to give up some of its heat there, a small part being diverted, if desired, to flow through duct 23 to the furnace 20 to act as secondary combustion air. It is the portion of this system last described and involving the furnace 20 and the gas preheater 15 and air preheater 14 with which the present application is specifically concerned. The important features of this part of the system are means to preheat the gases out of which the odors are to be burned preferably to a temperature as near as possible to the temperature of furnace 20, means to sustain the temperature in the furnace at a point sufficiently high to burn out the odors, and means to absorb heat from the gases leaving the furnace for use in preheating the gases.

It will be obvious that this is of rather general application and that the particular use made of this idea in the system described is only one possible application. The fuel, for example, used in the furnace might obviously be something entirely different than that used here and described herein. Moreover, the heat transfer from the gases leaving the furnace might be effected in a way and by means different from those shown here. While in this specific form illustrated and described this heat transfer is accomplished indirectly by fresh air absorbing the heat from the outgoing gases and delivering it or a part of it to the ingoing gases, the transfer might be accomplished directly from the outgoing gases to the ingoing gases. We therefore do not wish to be limited to the specific form herein disclosed but wish to have the invention protected to us within the scope of the appended claims.

What we claim is:

1. In apparatus resulting in gases charged with malodorous constituents of a nature such that these bad odors can be destroyed by raising the temperature of the gases to a certain point, the combination of a chamber separate from that in which the gases originate, a duct to carry the gases from their point of generation to the chamber, means to introduce into the chamber and then to burn a combustible in addition to any that may be present in the gases to raise the temperature to said point, a duct to carry the gases and the products of combustion from the chamber to the atmosphere, and means to transfer heat from the gases and products of combustion passing through said last named duct to the gases passing through the first named duct.

2. Apparatus for treating gases charged with malodorous constituents of a nature such that these bad odors can be destroyed by raising the temperature of the gases to a certain point, comprising a chamber separate from that in which the gases originate, means to convey the gases from their point of generation to the chamber, means to convey them from the chamber to the atmosphere, means to abstract heat from gases flowing from the chamber and to deliver it to gases on their way to the chamber, and means to burn combustible other than that which may be present in the gases enough to develop sufficient heat to destroy the odors if added to the gases in the chamber and to deliver the heat so developed to the gases in the chamber.

3. The process of burning out of gases odors caused by constituents of a nature such that these odors can be destroyed by raising the temperature of the gases to a certain point comprising conducting the gases to a chamber other than that where they originated, conducting them from the chamber to the atmosphere, absorbing heat from them after they leave the chamber and delivering it to gases on their way to the chamber, and raising the temperature of the gases in the chamber to the required point by adding further heat from a source other than the gases themselves.

4. The process of burning out of gases odors caused by constituents of a nature such that these odors can be destroyed by raising the temperature of the gases to a certain point comprising conducting the gases to a chamber other than that where they originated, conducting them from the chamber to the atmosphere, absorbing heat from them after they leave the chamber and delivering it to gases on their way to the chamber, and burning in the chamber sufficient combustible other than any that may be present in the gases to raise the temperature of the gases to the required point.

5. In apparatus resulting in gases charged with malodorous constituents of a nature such that these bad odors can be destroyed by raising the temperature of the gases to a certain point, the combination of a chamber separate from that in which the gases originate, a duct to carry the gases from their point of generation to the chamber, means to introduce into the chamber and there to burn a combustible in addition to any that may be present in the gases to raise the temperature to said point, a duct to carry the gases and the products of combustion from the chamber to the atmosphere, means to heat air by the products of combustion, means to transfer a part of the heat from the air to the gases flowing toward the chamber, and means to deliver other heat from the air directly to the chamber.

6. In apparatus resulting in gases charged with malodorous constituents of a nature such that these bad odors can be destroyed by raising the temperature of the gases to a certain point, the combination of a chamber separate from that in which the gases originate, a duct to carry the gases from their point of generation to the chamber, means to introduce into the chamber and there to burn a combustible in addition to any that may be present in the gases to raise the temperature to said point, a duct to carry the gases and the products of combustion from the chamber to the atmosphere, means to heat air by the products of combustion, means to transfer heat from a part of the air to the gases flowing toward the chamber, and means to deliver part of the air to the chamber.

HALDWELL S. COLBY.
RICHARD F. O'MARA.